(12) United States Patent
Jamieson

(10) Patent No.: US 6,401,525 B1
(45) Date of Patent: Jun. 11, 2002

(54) LEAK DETECTION IN LIQUID CARRYING CONDUITS

(75) Inventor: Angus Lamberton Jamieson, Banchory (GB)

(73) Assignee: I.P.R. Co. (21) Limited, Inchmarlo (GB)

( * ) Notice: Subject to any disclaimer, the term of this patent is extended or adjusted under 35 U.S.C. 154(b) by 0 days.

(21) Appl. No.: 09/701,467

(22) PCT Filed: May 28, 1999

(86) PCT No.: PCT/GB99/01715

§ 371 (c)(1),
(2), (4) Date: Nov. 29, 2000

(87) PCT Pub. No.: WO99/03317

PCT Pub. Date: Dec. 9, 1999

(30) Foreign Application Priority Data

May 29, 1998 (GB) ............................................. 9811474

(51) Int. Cl.⁷ ........................... G01M 3/28; G01F 15/00; G01S 3/80; G01N 3/28
(52) U.S. Cl. ...................... 73/40.5 R; 73/1.25; 73/1.35; 73/49.1; 73/40
(58) Field of Search .............................. 73/40.5 R, 1.25, 73/1.35, 61.73, 204.21, 861.66, 49.5, 40, 49.1, 1.17

(56) References Cited

U.S. PATENT DOCUMENTS

| 4,020,674 A | | 5/1977 | Fechter et al. ............ 73/40.5 R |
| 4,866,978 A | * | 9/1989 | Biggerstaff .............. 73/40.5 R |
| 4,890,483 A | * | 1/1990 | Vetter ...................... 73/40.5 R |
| 4,894,539 A | * | 1/1990 | Hurst ......................... 250/303 |
| 5,029,614 A | * | 7/1991 | Lara ............................. 138/90 |
| 5,272,646 A | * | 12/1993 | Farmer ....................... 364/509 |
| 5,442,951 A | * | 8/1995 | Göllner et al. ........... 73/40.5 R |
| 5,467,640 A | * | 11/1995 | Salinas .................... 73/40.5 R |
| 5,501,115 A | * | 3/1996 | Kamiyama et al. ........ 73/865.8 |
| 5,790,476 A | * | 8/1998 | Stenstrom et al. .......... 367/120 |
| 5,883,303 A | * | 3/1999 | Bliss et al. ................. 73/49.1 |
| 6,070,452 A | * | 6/2000 | Brannan ................. 73/40.5 R |
| 6,088,417 A | * | 7/2000 | Jax et al. .................... 376/250 |

\* cited by examiner

Primary Examiner—Hezron Williams
Assistant Examiner—David J. Wiggins
(74) Attorney, Agent, or Firm—Ratner & Prestia

(57) ABSTRACT

A drogue capable of being inserted into a water pipe and comprising a flexible bar in which are a pressure sensor, a battery pack, an electronics assembly and a magnetometer. The bar is surrounded by a bladder with an inlet valve at the front and an outlet valve at the rear. The drogue is attached to a suitable cable so that electrical signals can be conveyed to a computer to enable leaks within the water pipe to be identified and the position of the drogue identified. Also presented is a corresponding method which derives signals relating to volumetric flow for a series of locations in a conduit, in order to detect leakage and determine locations of such leakage, by measuring flow effects around a (moveable) large body and also measuring flow effects around a (moveable) small body at each location (the two bodies capable of being moved together thru the conduit at a set distance apart). The method is also practiced by measuring the differential pressures around each of the two bodies, as well as detecting localized turbulences, to derive information relating to volumetric flow rate at positions along the conduit.

16 Claims, 3 Drawing Sheets

LEAK DETECTION IN LIQUID CARRYING CONDUITS

This invention relates to a method and apparatus for detecting leaks in liquid-carrying conduits.

The invention is particularly suitable for detecting leaks in mains water distribution systems and will be described principally in relation to that use, However, the invention in its broader aspect may be used for detecting leaks in conduits carrying other liquids.

In many developed countries, water distribution systems contain pipework of considerable age and a high proportion of water may be lost through leakage from pipes. Conventional methods for detecting leaks are slow to use and low in accuracy, and it is common to have to excavate a considerable area in order to discover the precise source of a leak.

An object of this invention is to provide a method and apparatus which will enable leaks to be detected in a relatively simple and accurate manner, and may be used for surveying a network rather than reacting to the events such as subsidence.

From one aspect, the present invention provides a method for detecting leaks in a conduit carrying a liquid, the method comprising deriving, for a series of locations along the conduit, signals related to volumetric flow in the conduit by means of measuring the effects of flow around a relatively large body and around a relatively small body at each said location, and using change in volumetric flow as an indication of the location of a leak.

Preferably, the method comprises passing two test bodies of differing diameters serially through the conduit, detecting pressure differences around each of the test bodies, and using the pressure difference information to derive the volumetric flow rate at said positions along the conduit.

Preferably, the two test bodies are passed through the conduits simultaneously at a predetermined distance apart. Alternatively however, they could be passed through the conduit one at a time.

From another aspect, the present invention provides apparatus for detecting leaks in a conduit carrying a liquid, the apparatus comprising at least one test body to be passed through the conduit so as to provide a relatively large and a relatively small obstruction to flow at locations spaced along the conduit; means for measuring the effects of flow around said obstructions; and means for transmitting said measurements to a remote location at which a measure of the volumetric flow at said locations is derived.

The invention further provides apparatus for detecting leaks in a conduit carrying a liquid, the apparatus comprising first and second test bodies to be passed through the conduit, each of the test bodies being provided with means for measuring the pressure difference around it, and means for transmitting signals representative of said pressure differences to a remote location at which the pressure difference signals are used to derive a measure of the volumetric flow rate of the liquid at locations along the conduit.

Preferably, each of the test bodies is neutrally buoyant in the liquid of interest.

Preferably also, the maximum test body diameter is no greater than 60% of the pipe diameter. Typically, one test body will have a diameter of approximately 50% of the pipe diameter and the second test body approximately 20% of the pipe diameter.

In a preferred form of the apparatus, the two test bodies are connected together by a cord or the like to be passed through the conduit at a predetermined spacing apart, the downstream test body being in the form of an inflatable bladder, and the upstream tests body carrying electronics for transmitting pressure signals to a remote location, suitably via a co-axial cable.

In a particularly preferred form of the invention, the pressure sensors are used also to indicate the presence of localised turbulence, and the presence of a leak is indicated by such localised turbulence in combination with a reduction in volumetric flow downstream thereof.

An embodiment of the present invention will now be described, by way of example, with reference to the drawings, in which FIG. 1 is a schematic view illustrating part of a water distribution system;

Figure 1:
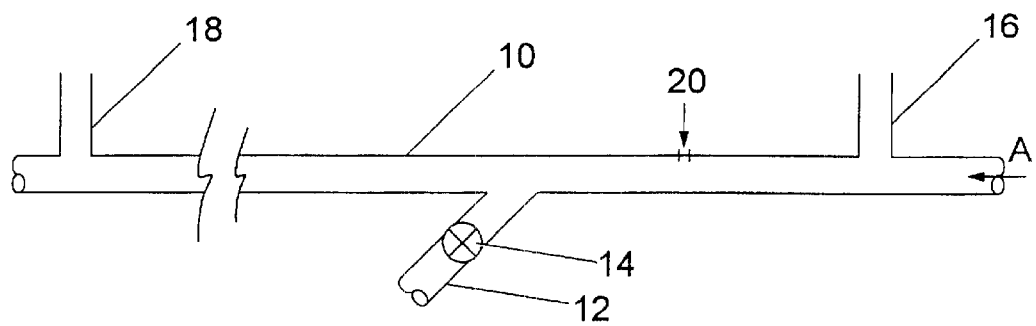

Referring to FIG. 1 a mains water distribution system includes a main pipe 10 through which water flows in the direction of the arrow A. A branch pipe 12 is provided with a flow means 14 which allows the volume of flow diverted at this point to be measured. The length of pipe 10, which could be in the region of 4 kilometres in length, is provided with stand pipes or other access means 16 and 18. A leak is schematically indicated at 20.

The sequence of events in use of the present embodiment is illustrated in FIG. 2. A soft ball 22 is inserted at the upstream end via the stand pipe 16 (FIG. 2A) and is carried downstream by the water flow until it is captured and extracted at the downstream stand pipe 18 (FIG. 2B). The ball 22 is attached to and tows a cord 24 which is preferably a soft cord to permit passage around corners and other obstructions. The ball 22 and cord 24 are preferably of neutral buoyancy in the water.

Figure 2A:
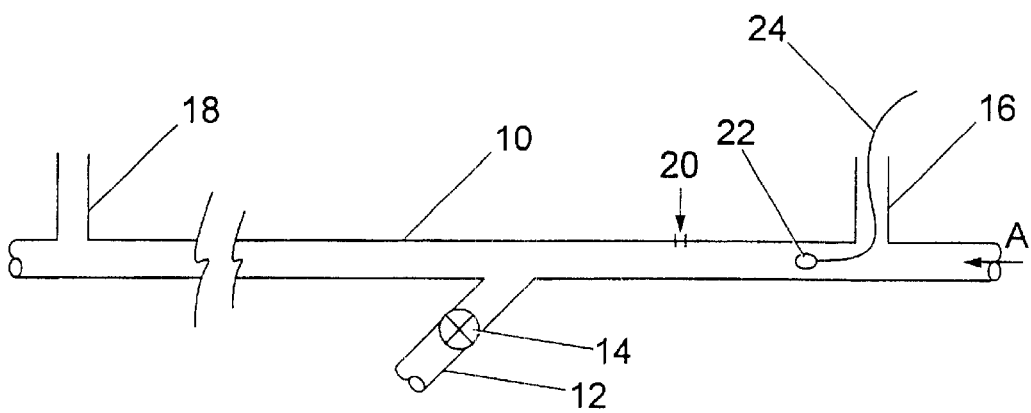
FIG. 2 shows a sequence of events in using one form of the invention.
Figure 2B:
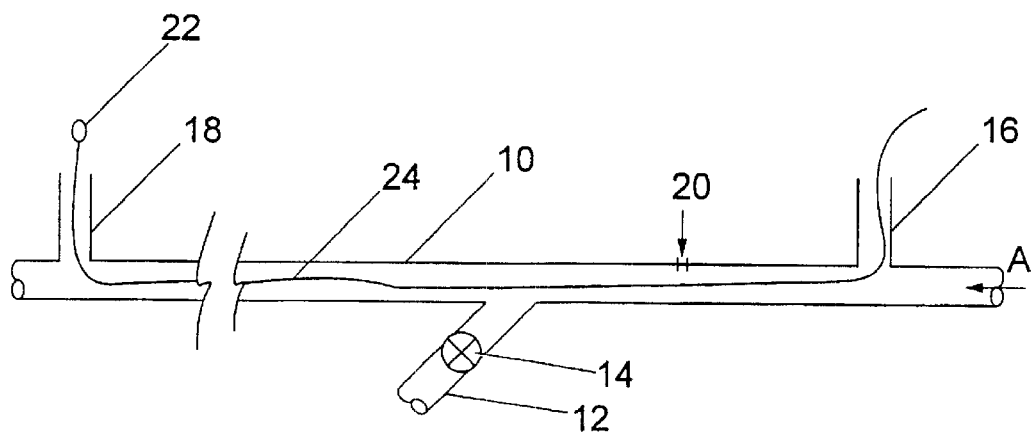
Figure 2C:
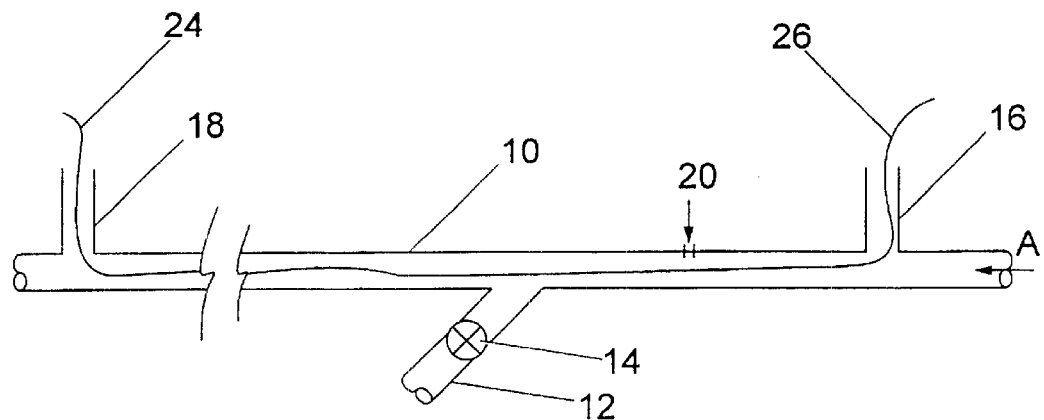
Figure 2D:
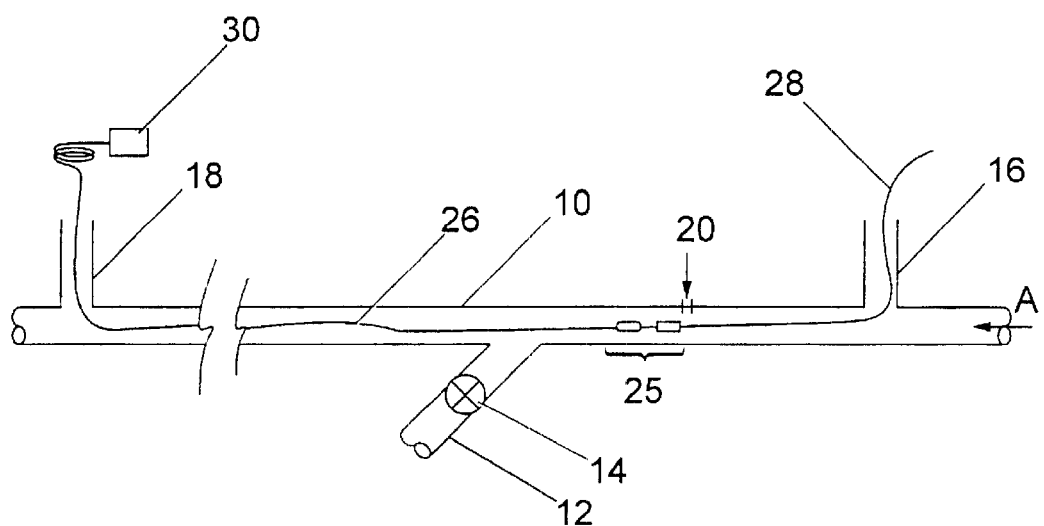
Figure 3:
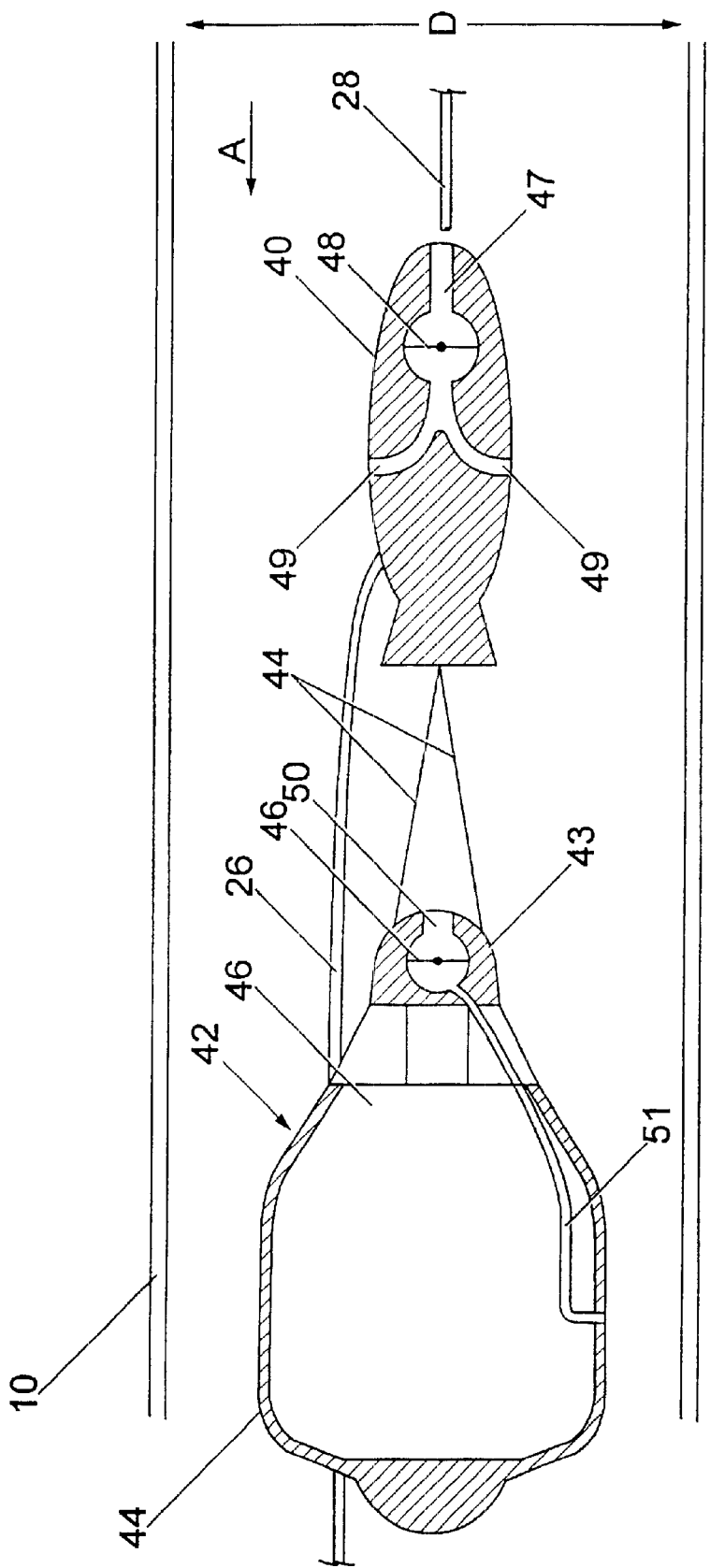
FIG. 3 shows in more detail an apparatus used in FIG. 1

Once the ball 22 has been received at the downstream stand pipe 18, the cord 24 is attached at the upstream standpipe 16 to a co-axial cable 26 which is then pulled downstream by means of the cord 24 to the downstream stand pipe 18 (FIG. 2C).

The apparatus 25 to be described is then connected to the co-axial cable 26 at its downstream side and with a nylon cord 28 at its upstream side, and is passed from the upstream stand pipe 16 to the downstream stand pipe 18. The apparatus 25 is carried along the pipe 10 (FIG. 2D) by the water flow under the control of the cord 28, meanwhile transmitting signals via the co-axial cable 26 to an instrument package 30 adjacent the downstream stand pipe 18.

The upstream body 40 is a metal, generally cylindrical body with stabilising fins, typically having a diameter is of about 20% of D. The downstream body 42 comprises a nose cone 43 and a rubber bladder 44 having an open end 46 which fills under water flow and expands to about 50% of D.

The downstream test body 40 carries a pressure sensor 46 which is connected by wiring (not shown) to the upstream test body 42. The upstream body 42 carries a pressure sensor 48. Each of the test bodies 40 and 42 is neutrally buoyant in water.

The pressure sensors 46, 48 used in this embodiment are silicon diaphragm differential pressure sensors by Honeywell. Each sensor comprises a silicon diaphragm having opposite faces exposed to the water pressure communicated by suitable passages. In the upstream body 40, an integral passage 47 leads from the front (upstream) end of the body to one face of the sensor 48, and two passages 49 to-the sides. In the downstream body, the front of the sensor 46 is in communication with a front-facing passage 50, and the rear communicates via a tube 51 with the side of the bladder 44.

As the apparatus 25 is passed through the pipe 10, the preferred method is to hold it stationary every 10 meters or so. Each time this is done, the pressure sensors 46 and 48 will measure the differential pressure between the upstream facing end and the annulus formed between the test body and the pipe wall. The difference between the pressure differential as measured at one body when compared with the pressure differential as measured at the other allows the derivation of a measure of the pipe diameter. Note that the effective pipe diameter cannot be assumed to be the nominal diameter as installed, because of the build up of scale and silt. The pressure difference at is either body allows the velocity of flow to be determined. The diameter and velocity can then be combined to give a measure of volumetric flow of water.

In more detail, the volumetric flow V in the pipe is $$V = V_f \pi (R_p^2 - R_s^2)$$

where $V_f$ is the flow velocity $R_p$ is the radius of the pipe $R_B$ is the radius of the test body If $R_p$ is unknown, V cannot be calculated. However, if two test bodies of different radii $R_1$ and $R_2$ are used $$V_1 = V_{f1} \pi [R_p^2 - R_1^2]$$

and $$V_2 = V_{f2} \pi [R_p^2 - R_2^2]$$

Since $V_1 = V_2$, assuming no leakage between the two test bodies, $$V_{f1} R_p^2 - V_{f1} R_1^2 = V_{f2} R_p^2 - V_{f2} R_2^2$$

and hence $$R_p = [(V_{f1} R_1^2 - V_{f2} R_2^2)/(V_{f1} - V_{f2})]$$

and $$V = \pi (R_p^2 - R_1^2) V_{f1}$$

The signal from a given pressure sensor can also be used to measure whether the water flow is steady or turbulent; a rapidly fluctuating pressure signal indicates turbulent flow. This effect is strengthened by using neutrally-buoyant bodies of significantly less diameter than the pipe. These factors lead to the test bodies riding in the low pressure water flow in the centre of the pipe, where eddy effects from the pipe wall are minimised.

If there is a significant leak in the pipe, there tends to be local turbulence. Thus, the detection of turbulence is an indicator of a potential leak. However, other sources of turbulence may exist in the pipe, such as localised obstructions. It is preferred therefore to identify a leak by a combination of the existence of localised turbulence together with a reduction in volumetric-flow downstream of that location as compared with upstream. It will be appreciated that for this purpose, it is not essential to derive a quantitatively correct volumetric flow, but rather to derive some consistent measure of volumetric flow, and thus calibration to standard units is not necessary.

The location of the pressure sensors on the front and side surfaces of the body is preferred. Location on the front and rear is possible, but the rear of the test body tends to experience flow turbulence which would make the reading less useful.

When a suspected leak is detected, it is preferred to move the instrument 25 in small increments, say of 1 meter, downstream in order to locate the leak as closely as possible. It is generally not practicable to move the instrument upstream.

The position of a leak may be derived by measuring the length of the coaxial cable 26 within the pipe 10. The coaxial cable 26 is preferred for this purpose rather than the nylon cord 28, because the former is unloaded and has lower inherent stretch. The position of the leak can than be estimated on the surface by measuring along the known route of the pipe 10.

Other means for fixing the location of the leak may be used. One means is to stream a fibre optic cable alongside the coaxial cable 26 and measure the distance by laser pulses. A more direct means is to make use of the pressure sensors in the apparatus 25, which have a high sensitivity. This can be used to refine the location after it has been approximated, by making impacts on the ground surface above the pipe 10 and seeking the maximum response from the pressure sensors.

It is also possible to incorporate in the instrument 25 a radio or acoustic transmitter to be detected from the surface, or means such as a magnetometer or laser gyro for giving heading information and thus correlating with a map of the pipework.

When the survey has been completed, the apparatus 25 may be removed at the downstream standpipe 18, together with the nylon cord, or the latter may be recovered upstream.

Although described above with reference to the use of two test bodies of different diameters traversing the pipe simultaneously, the same information could, in principle, be derived by passing two test bodies of different diameters, one at a time, although this would be less convenient. It is also possible to make use of a single test body whose diameter can be cycled between a smaller and a larger value, for example by the use of hinged flaps or the like, or an inflatable bladder having an upstream inlet valve and a downstream outlet a valve, with the valves controlled such that the inlet valve is open while the outlet valve is closed, and vice versa. This would enable readings at both diameters to be taken at each station along the pipe.

It is further contemplated that, instead of using the pressure difference across part of the test body, similar flow-related information could be obtained by measuring the force exerted by a test body on the line restraining it, for example by including a strain gauge in the line.

Access to the pipe is gained through stand pipes such as 16 and 18. Suitable stand pipes may be present in many mains systems. Alternatively, special standpipes may be secured to the pipe for the purpose. Means for temporarily attaching stand pipes and the like are well known in the art. It will be appreciated that for most of the procedure described above the only item passing through the standpipes is a cord or a cable, and suitable glands may readily be provided. The stand pipes may be provided with upper and lower valves (not shown) for use in inserting the removing the apparatus.

The invention thus provides a relatively simple method and apparatus which enables the systematic surveying of mains water supplies, and other liquid-carrying conduits, to locate leaks.

What is claimed is:

1. A method for detecting leaks in a conduit carrying a liquid, the method comprising deriving, for a series of locations along the conduit, a set of signals related to an actual amount of volumetric flow in the conduit by means of measuring the effects of flow around a relatively large body and around a relatively small body at each said location, and using a calculated change in between said locations volumetric flow as an indication of the location of a leak.

2. A method according to claim 1, which comprises passing two test bodies of differing diameters serially through the conduit, detecting pressure differences around each of the test bodies, and using the pressure difference information to derive a set of values for volumetric flow rate at positions along the conduit.

3. A method according to claim 2, in which the two test bodies are passed through the conduit simultaneously at a predetermined distance apart.

4. A method according to claim 2, in which the two test bodies are passed through the conduit one at a time.

5. A method according to claim 1, in which a single test body is passed through the conduit, the cross-section of the conduit being changeable between a relatively small and a relatively large value.

6. A method according to claim 1, further including the step of detecting localised turbulence in conduit, the presence of a leak being established by the location of localised turbulence in combination with a reduction in volumetric flow downstream of that location.

7. Apparatus for detecting leaks in a conduit carrying a liquid, the apparatus comprising at least one test body to be passed through the conduit so as to provide a relatively large obstruction and a relatively small obstruction to flow at a set of sequential locations spaced along the conduit; means for measuring the effects of flow around said obstructions; and means for transmitting said measurements to a remote location at which a measure of the volumetric flow at said locations is derived.

8. Apparatus for detecting leaks in a conduit-carrying a liquid, the apparatus comprising first and second test bodies to be passed through the conduit, each of the test bodies being provided with means for measuring the pressure difference around it at a set of sequential locations spaced along the conduit, and means for transmitting signals representative of said pressure differences to a remote location at which the pressure difference signals are used to derive a measure of the volumetric flow rate of the liquid at said set of locations along the conduit.

9. Apparatus according to claim 8, in which each of the test bodies is neutrally buoyant in the liquid of interest.

10. Apparatus according to claim 8, in which the maximum test body diameter is no greater than 60% of the conduit diameter.

11. Apparatus according to claim 10, in which one test body has a diameter of approximately 50% of the conduit diameter and the second test body approximately 20% of the conduit diameter.

12. Apparatus according to claim 8, in which the two test bodies are connected together by a cord, bar, rod, pole, chain or tether to be passed through the conduit at a predetermined spacing apart.

13. Apparatus according to claim 12, in which the downstream test body is in the form of an inflatable bladder, and the upstream test body carries electronics for transmitting pressure signals to a remote location.

14. Apparatus according to claim 8, in which the means for measuring the pressure difference around each test body comprises first and second pressure transducers spaced apart on the test body in the direction of flow.

15. Apparatus according to claim 14 in which, on each test body, the first pressure transducer faces upstream and the second pressure transducer faces to the side.

16. Apparatus according to claim 14, in which the output from at least one of said-pressure transducers is used to give an indication of localised turbulence in the fluid flows.

* * * * *